United States Patent [19]

Costa et al.

[11] Patent Number: 5,787,258

[45] Date of Patent: Jul. 28, 1998

[54] LIFE SAFETY SYSTEM HAVING A PANEL NETWORK WITH MESSAGE PRIORITY

[75] Inventors: Hilario S. Costa; Andrew Novetzke, both of Sarasota, Fla.

[73] Assignee: General Signal Corporation, Stamford, Conn.

[21] Appl. No.: 644,479

[22] Filed: May 10, 1996

[51] Int. Cl.[6] .................. G06F 13/00; G06F 13/18; G06F 15/16

[52] U.S. Cl. .................. 395/200.81; 395/200.54; 395/200.38; 395/830; 395/823

[58] Field of Search .................. 395/830, 828, 395/823, 284, 200.38, 200.53, 200.54, 200.81

[56] References Cited

U.S. PATENT DOCUMENTS

| | | | |
|---|---|---|---|
| 5,347,515 | 9/1994 | Marino | 370/85.2 |
| 5,528,594 | 6/1996 | Butter et al. | 370/85.5 |
| 5,613,073 | 3/1997 | Hammond, Jr. et al. | 395/250 |
| 5,634,006 | 5/1997 | Baugher et al. | 395/200.06 |
| 5,655,149 | 8/1997 | Muegge et al. | 395/830 |

*Primary Examiner*—Thomas C. Lee
*Assistant Examiner*—Rehana Perveen
*Attorney, Agent, or Firm*—Ohlandt, Greeley, Ruggiero & Perle

[57] ABSTRACT

A life safety system having message priority of a network of panels, each panel including a first module in the form of a central processing unit, and a plurality of local I/O modules connected to the central processing unit and to each other. To establish a message priority in communication between the panels, including a two-state token form of coded invitations to transmit messages, the first state of the token represents the low priority invitation and the second state of the token represents the high priority invitation. Moreover, to further establish message priority including the passing of tokens continuously between panels to determine if any panel has the high priority message, that panel having the high priority message preempts communication of such messages between panels by first capturing the high priority state token.

7 Claims, 8 Drawing Sheets

LIFE SAFETY SYSTEM HAVING A PANEL NETWORK WITH MESSAGE PRIORITY

BACKGROUND OF THE INVENTION

The present invention relates to life safety systems and, more particularly, to a fire alarm system or the like in which multiple panels at a central station form a sub-system or network which uniquely incorporates message priority, and network shadowing, as well as other features.

A modern day fire alarm system or the like typically involves a central station or central control panel at which reports come in from a variety of zones or stations with respect to alarm and trouble conditions and the like so that there can be complete monitoring of untoward conditions so as to insure protection of personnel by giving them sufficient warning of the conditions. The present invention is focused or directed to the central panel sub-system or network at the central station which typically includes multiple panels formed in a network so that activities or events occurring at a variety of stations can be completely monitored. The panels are provided with central processing units or modules which control the sub-system and which communicate with each other and with a plurality of local I/O modules associated with each central processing unit (CPU) at each of the panels.

Related inventive features of the panel sub-system can be appreciated by reference to the following co-pending applications:

| | |
|---|---|
| 100.0608 | EST 3 Audio System |
| 100.0609 | Fire Fighters Control Center |
| 100.0610 | Automatic Addressing In Life Safety System |
| 100.0611 | Configuration Programming For A Life Safety Network |
| 100.0612 | Core Modules For A Life Safety System and Structure For Supporting Such Modules In A Panel Housing | all of which above applications have been assigned to the assignee of the present invention. The details of the construction and operation of the features described in the above-noted related applications are incorporated herein by reference.

It will be apparent from prior art references cited in assignees related applications that there are a number of major deficiencies in prior art life safety systems, particularly fire alarm systems and the like. Prior art systems have tended to operate at very low speeds and to lack message priority, particularly in the case of an alarm condition which requires the highest priority. Moreover, there are often undesirable propagation delays in the operation of such systems.

One of the fundamental drawbacks to a large number of prior art systems is that they involve low speed polling schemes such as those which determine whether particular stations on the system are in an alarm condition by sequentially interrogating each station or device on the system and comparing addresses which are being transmitted with the unique address that has been assigned to each station or device. It is often necessary to override the normal polling operation where an alarm condition arises which demands priority. Moreover, one will appreciate that if a particular station at a certain point in the interrogation cycle is not then in alarm but goes into alarm immediately afterward, the whole group or batch of addresses must be gone through until the address of that particular station is reached again. Such delays become intolerable in advanced technology systems.

Accordingly, it is a primary object of the present invention to provide a panel sub-system with a network of panels that operate at very high speed in transmitting messages and in which there are minimal propagation delays; and further to provide efficient message priority, particularly in the case of alarm conditions on the system. Another object is to insure that if one CPU "goes down", for example, loses power, an immediately adjacent CPU in the network will assist in the task of bringing the CPU that went down back up to achieve its proper assigned operation.

Another object is to insure that if particular CPUs in the system lose power the network connection will not be lost or interfered with. In other words, the continuity of the system will always be maintained.

Another object of the present invention is to enable both exclusive and shared bandwith communication on the system.

Yet another object is to enable network operation even when there are a variety of physical breaks or "opens" in the wiring system.

A further object is to simulate wiring break desired in the system by software means; for example, when it is particularly desired that communication to a particular central processing unit CPU be cut off.

SUMMARY OF THE INVENTION

The fundamental feature, namely the message priority feature, which fulfills a primary stated object, is characterized as follows: a life safety system having message priority comprising a network of panels, each panel including a central processing module (CPU) and a plurality of local I/O modules connected to said CPU and to each other; means for establishing message priority in the communication between said panels, said means including a "token"; that is to say a signal packet that can exist in either of two states (in the form of coded messages), the first state of the token representing a low priority invitation to transmit and the second state representing a high priority invitation to transmit; said means for establishing message priority including means for passing the tokens continuously between panels as an invitation to each CPU to transmit, for example, an alarm condition if such exists, and to pass the token if such condition does not exist; means at each of said CPUs for responding when the high priority token has been returned to it to transmit a low priority message if such is called for.

Another fundamental feature, which fulfills another primary object, is defined as "network shadowing". What this provides is the capability of adjacent central processing units or modules in a network to assist in the recovery of a central processing unit that has become disabled Other and further objects, advantages and features of the present invention will be understood by reference to the following specification in conjunction with the annexed drawings, wherein like parts have been given like numbers.

DESCRIPTION OF THE PREFERRED EMBODIMENTS

This description is divided into five parts: Part I provides the design for the network software component; Part II describes (in prose) the algorithms and data structures that implement the network software applications program interface and hardware interface; Part III describes the panel sub-system or network hardware; Part IV gives specific examples of network operation involving the token - pass scheme; and Part V provides software flow charts which aid in understanding (1) the operative steps in controlling and implementing the network token - pass scheme, and (2) the network shadowing scheme. Also included is an explanation of the codes used in the system to represent the network token in its two states, i.e., its high priority indication and its low priority indication.

I. THEORY OF OPERATION AND GENERAL OVERVIEW

General

The network software is designed to provide a reliable message delivery service to/from panels on a fire alarm network. "Reliable" in this context means a message is broadcast (sent to all panels) or sent point to point (from one panel to another panel), and is retried a specified number of times until the receiving panel(s) acknowledge the successful communication (transmission and reception only) of the message. The application will be informed of the success or failure of the transmission of the message and if a failure occurs will be provided with a reason for the failure (typically timeout waiting for ACK/NAK, where ACK means "acknowledge" and NAK "not acknowledge".

Physical Layer

The physical link layer is point to point, repeated, half duplex, RS-485 communications. The link direction is managed by this software system. The topology may be a single line (Class B) or a loop (Class A). The current state of the link directions is dictated by a temporary master. The passing of the master is accomplished by the transmission of a token called an Invitation To Transmitt (ITT). Only the panel in possession of the token is allowed to transmit. This transmission may be of two priorities, high (alarm) or low. A specific algorithm governs when panels are allowed to transit. Transmission of messages is limited to two byte sizes to insure minimal response times for alarms.

Panel Numbering

Panels are numbered physically according to the current wiring configuration (the current configuration may be different from the installed configuration due to line breaks, down panels, etc.). Panels will have logical addresses assigned by their downloaded databases. The network will operate in a physical address only mode until all panels have minimal configuration describing the logical address of a panel and the target baud rate for network operation. In class A networks the panel given logical address 0 or its equivalent will also be considered physical address 0 for startup condition.

Right/Left

For conventions in this specification the following terms are used: The link from the first physical panel to the second physical panel is on the right of the first physical panel and to the left of the second physical panel. This direction naming applies to all panels such that a link leading to the next higher physical panel (or the first panel if it is the last panel in a class A network) is the "right" direction. Links leading to the next lower physical panel (or the highest physically numbered panel in the case of the first panel in a class A network) are the "left" direction. Panels are dynamically configured to the following states;

Receiving left, retransmitting right (in one SCC then back out another SCC, where SCC means Serial Communication Controller)

Retransmitting left, receiving right

Receiving left, repeating right (electrical repeat)

Receiving left and right

Transmitting left and right

Receiving left, transmitting right

All of these states are not used in all operational modes. Some are used at startup, others at reconfiguration time or when a disabled panel rejoins the network.

Operating System/Interface

The interface to the application program is as described in the Network API documentation. The registered functions are called by the network software. It is assumed that the called functions will not stop but will execute to completion and return to the network software. Delaying the return by waiting on operating system objects is prohibited.

The software will be executed as several tasks and interrupt handlers for the SCC's. The software will use one of the MC68302's internal timers or will multiplex usage of the system clock tick timer.

II. PROTOCOL/LINK LAYER

This section describes the data structures and algorithms to implement the packet layer transfers and general network operation at the low level. This layer assumes the transmission of single packets or reception of single packets for this panel. This layer will transmit a single packet and obtain acknowledgment or timeout. This layer has at most two pending packets, an alarm priority and a low priority packet. Each packet has an associated flag that determines if this layer is to release the token at the end of the packet or transmit the next packet. A higher level to the network software (Section 0, Message - NAPI layer) will perform the interface to the application and create the appropriate data for this layer. The higher level will evaluate the status produced by this lower level.

This section first discusses the operational states and algorithms of the network as a whole, then the data structures required for this layer. The pseudo code algorithms for all layers are described in Section 0, Algorithms.

NORMAL OPERATION

Definition of Normal Operation

Normal operation is defined as any state of the network where all panels that are Not disabled are actively participating in the network. The network is operating at the target baud rate, all panels having been configured. If the network is Class A then one panel has been identified as panel 0. NO panels have had communication failures to/from another panel. The following network wide algorithm is functioning (Class B).

Token Possession/Temporary Bus Master (TBM)

One panel possesses the ARMPITT (AlarRM Priority Invitation to Transmit) and the LOWPITT (LOW Priority Invitation to Transmit). This panel has just been passed and acknowledged the reception of the LOWPITT. Transmission and reception of the LOWPITT implies transmission and reception of the ARMPITT. All panels to the left of this panel will have received the transmission and reception of the LOWPITT and will reconfigure their 485 drivers to adjust for the new PITT owner. This adjustment is such that all panels to the "left" (see section) Right/Left) of the new LOWPITT owner will receive right/repeat left. All panels to the right of the new LOWPITT owner will receive left/repeat right. The new LOWPITT owner will assume transmit left/transmit right.

Transmit/Response Cycle

This panel can be ready to transmit an alarm priority packet (a packet can be a whole message or part of a message) or not. If this panel has an alarm priority packet it will send that packet (typically a broadcast) to the destination panels on the network. The addressing in the packet will inform all panels on the network if the packet was broadcast or point to point.

All panels for which the packet was intended will respond with an ACK/NAK or will time out as follows:

Upon receipt of a packet all panels to the left of the LOWPITT owner (Temporary Bus Master TBM) will turn their drivers to the receive left/repeat right mode. Panels to the right will remain in receive left/repeat right mode.

The lowest panel number to the left (usually 0) will respond with ACK messaging indicating successful communications. It will respond with a NAK packet if the communications had errors. If the panel fails to respond within predetermined ms from the end of the original broadcast packet this panel will be marked as TIED OUT by the TBM. Panel 0 will then return its drivers to the receive right/repeat left mode.

All higher numbered panels will detect the ACK/NAK or TIMEOUT. At the sooner of the reception of the ACK/NAK or TIMEOUT, all panels will restart the timeout timer. Panel 1 will then respond, in turn, and so on through all panels up to the TBM.

Once all panels below the PITT owner have responded, the panels to the right of the TBM will swap drivers to receive right/repeat left mode. The largest panel number will respond with ACK/NAK or will time out. This will continue until all high side panels have responded. Each high side panel will flip drivers after responding.

Two special cases exist: 1) the TBM is panel 0 or 2) the TBM is the last panel For case 1, all panels know the panel number of the TBM and the reply algorithm automatically starts with the highest panel. For case 2, the TBM adjusts by ending the reply cycle at the panel to the left of it.

If all panels ACK'd properly then the PITT owner will continue with the algorithm, otherwise the TBM will implement retransmits. The packet is resent with a re-send bit set and possibly multiple address headers to panels that NAK'd or timed out. All panels will receive the retransmit request, only panels that have their address in the resent packet will respond according to the response algorithm above.

If the TBM has NO alarm packet to transmit, it will pass the ARMPITT to the next physical Node the token pass will be explained subsequently). When the ARMPITT returns to the TBM it is then allowed to transmit a low priority packet. The low priority packet is transmitted and responded to with the same algorithm as the alarm priority packet. Once the packet has been transmitted the TBM passes the LOWPITT to the next panel in sequence (or panel 0 in the case of the last panel. The token is passed as follows:

The TBM sends a special packet containing the LOWPITT addressed to the next panel.

All panels receive the special packet.

The panel receiving the LOWPITT changes its drivers to transmit left/transmit right and transmits the ACK or NAK. If NAK the drivers revert to receive left/repeat right. If ACK the drivers remain transmit left/repeat right.

The old TBM changes drivers to receive right/repeat left.

The receiving panel repeats the previous algorithm as the new TBM.

If the new TBM is panel 0, the token is "wrapping" from end to end. In this case the old TBM returns to a receive left configuration to receive the ACK from panel 0. All intermediate panels sense the address of the new TBM and adjust the drivers to first transmit the token, then reverse direction to pass the ACK/NAK back to the old TBM. After the ACK, panels 0 through N return to a receive left/repeat right mode awaiting the next activity from panel 0.

If the new TBM fails to respond or responds with too many NAKs the token is said to be "dropped" and the network enters startup mode.

Thus the network passes packets at two priorities as described. If a Node receives the ARMPITT only without the LOWPITT this is interpreted as an invitation to be TBM but only for alarm priority messages. In this case the message send/response cycle takes place with this Node as TBM, however if at the end of the transmission of the alarm priority packet (or packets in the case of a bus hold message) the ARMPITT must be passed without sending a low priority packet.

Class A Transmit/Response Cycle

For Class A networks all the above algorithms apply with a few exceptions which amount to simplifications. The 485 drivers are never turned except for the TBM. The TBM configures its drivers for receive left/transmit right. All other Nodes will stay in the receive left/repeat right mode until they become TBM. The TBM will receive its own transmissions on the left side, validating the continued integrity of the Class A topology. ACK/NAK responses will begin with the panel to the right of the TBM and continue modulo the number of panels to finish at the panel to the left of the TBM.

Dropped Token

The network may break and be forced to enter startup mode by the following conditions:

The token is dropped (either ARM or LOW).

A Node fails to see any transmissions within a predetermined time period. This is accomplished by having a Node receive the token and fail to transmit for the time out interval. This is used by an end Node to rejoin two subnets that had broken.

Startup/Reconfiguration

Startup is the state of initial power up or in the case of a dropped token. The objective of the startup state is to determine the physical configuration of the current network and begin normal network operations. Startup will only enter the normal operational state if all physically installed panels (that are enabled to join the network) have been configured with logical addresses and the target baud rate.

Class B Startup Algorithm

Message Types

The startup algorithm uses the following messages:

"I am here" message (with repeat count)

Query message

Query response message

Start net message (includes physical and logical address and baud rates)

Algorithm

The startup algorithm is as follows:

All panels determine a reconfiguration/startup is to take place within predetermined ms.

Each panel executes a fixed delay to allow all panels to reconfigure the 485 drivers to receive left/transmit right. SCC's are configured to the startup baud rate (9600).

All panels transmit to the right and "I'm here" message with a count field containing a 0.

Each panel will receive an "I'm here" message with the count field set to 0 (except the first panel). Once the message has been received correctly and after this panels original "I'm here" message is transmitted the received "I'm here" is re-transmitted with the count field incremented to 1.

Panels will continue to receive "I'm here" messages with the count field>0. The count field is incremented and the message re-transmitted. All messages will terminate at the last panel.

Each panel will count the number of "I'm here" messages received. The number of messages received will be this panel's physical address.

Panel 0, the one receiving NO "I'm here" messages will after transmission of the "I'm here" message wait for predetermined ms and initiate the ACK sequence.

All panels at the end of the timeout period enter the ACK mode for startup. The ACK mode puts all panels in receive left/repeat right mode.

Panel 0 sends a query message to panel 1 soliciting an acknowledgment. Panel 1 responds by forcing his drivers into transmit left/transmit right and transmitting a query acknowledge (received by all panels) that includes this panel's (1) physical address, logical address and operational baud rate. If this panel has NO logical address then the logical address field is set to all FF (hex). The baud rate will be encoded.

Panel 0 receives the acknowledgment and sends a similar message to panel 2. Panel 1 facilitates the messages by receiving the packet inspecting the physical address and message type and switching the drivers appropriately.

Each panel, in turn, will be polled by panel 0 until the last panel. The next panel will not respond and panel 0 will time out waiting. Panel 0 will then assume the configuration is all known and initiate normal operation.

All panels will be left in a receive left/repeat right mode. Panel 0 will broadcast one message indicating "start network". This message will include the list of logical addresses (panel 0 to panel N), the baud rate (lowest of the responses) and the number of physical panels.

Panel 0 will then assume possession of both tokens and the normal mode is entered.

Class A Network Startup

Class A networks have several deviations from the startup algorithm for class B networks. In the case of Class A there is NO panel that receives NO messages. The installation process must identify a panel as physical Node 0. This panel will eventually receive a "I'm here" message with a count greater than the predetermined maximum possible Nodes. At this point panel 0 detects that a Class A network is present. It then stops retransmitting the "I'm here" message and instead transmits a "Class A detected" message. When this message is received by panel 0 all panels will have forced the 485 drivers into the operational state of receive left/ repeat right except panel 0. Panel 0 will then send the query message to panel 1, wait for query response, etc., exactly as the Class B network except the drivers will not switch directions. All panels will respond in turn until the attempt is made to panel N+1 at which point the query response will time out. Panel 0 will then send the "start network" message with the physical/logical address map, and baud rate. Panel 0 will then assume possession of the token and start the network in normal operation.

Node Failure/Node Disable

The network may become NO-operational temporarily causing a reconfiguration. This may occur for several reasons:

A panel is forcibly removed from the network manually, e.g., powered down The startup algorithm is as follows:

A panel receives a message to disconnect itself from the network

A panel has communications failure, noisy lines, broken lines, etc.

When a panel "fails" the remaining panels will detect the failure when the token fails to be passed to the "down" panel or cannot be passed to a panel beyond the "down" panel due to communications problems. At this point all Nodes will reconfigure and restart with subnets in the case of comm fail or a reduced size network if a panel is taken off line. note a panel may be taken to a disabled state but still participate in a network. It will either send or receive general messages but will respond to a special broadcast message informing it to rejoin active transmission and reception of all classes of messages. A panel in this state will simply pass the token and participate in changing the line drivers within the SSC where appropriate (class B).

Link Disable/Failing Links

Panels may become disabled or communication links may be become disabled. The network must handle the two or more disjointed Nodes appropriately and rejoin then when possible or when commanded to by another panel. The responsibility of forcing a reconfiguration to rejoin panels or re-establish a communications link is the responsibility of the end Nodes. For any given Class B network the two end panels (0 and N) execute slightly different algorithms than the interior Nodes with respect to their unconnected "ends".

End Panel Algorithms

Panel 0 is defined to be that panel in a Class B that received NO "I'm here" messages. The result is that panel 0's left has NO panel (at least for this reconfiguration cycle). Panel 0 configures that driver as a receiver from the left side at a low reliable baud rate (9600). The right side is configured as transmit or receive according to the network or startup algorithm currently being executed. Panel 0 will periodically configure the left drivers for transmit and send a message which means "Are you there?".

Panel N will execute the same algorithm as panel 0 with the directions reversed. It will periodically configure the right drivers for transmit and send an "Are you there?". The period of panel N and panel 0 will be non-integer multiples of one another such that the probability of multiple collisions is low.

If either panel detects a response indicating "Yes I am here" then the two panels (0 of one subnetwork and N of another subnetwork) will establish a low speed (9600 baud) half duplex keep alive communications.

Subnet Rejoins

If both panels indicate that the link should be enabled then both panels will destroy the tokens on both subnets and configure the drivers to the startup state, both subnets will then be rejoined to a single net. If either or both panels indicate that the link (not a panel) is disabled then neither panel will destroy the token(s) and both panels will continue to dialog on the low speed link. If, after the low speed link is established, either panel receives a command to re-enable the link this message will be echoed to the other panel and the tokens will be destroyed/subnets rejoined, etc.

Forced Link Disable

A link which consistly is producing errors may be disabled. A link is disabled by sending a message to either panel at ends of the link to disable the connecting link. The panel(s) that receives the message will force the left or right 485 drivers into the receive, occasional transmit state of an end panel. The token will effectively be destroyed by the end panel and both subnets will reconfigure as separate nets. A message may be received later which re-enables the link (after repair, for example).

Download Mode Protocol

The receiver will periodically check the un-connected link for the download protocol to allow a local computer to perform maintenance. The local computer shall use the "I'm here" protocol described in Section 0 End Panel Algorithms.

Broadcast Packet Reception

Packets which are sent with the broadcast address will be placed in the ping pong buffers. The high level protocol will assemble these packets into messages. The high level software will maintain buffers for multiple broadcast messages from different panels on the network.

Point to Point Messaging

Point to point messaging is partially managed at this level. If the low priority message that is pending is a point to point this level software will respond to three commands, open, send and close. For open the protocol software will receive a packet in the buffers indicating open channel. The open channel packet will be sent when the low priority token allows it (the software will round robin between low priority packets and point to point packets. The Token will then be passed. When the target Node receives the token it will return an acknowledgment allowing the connection of denying the connection. The protocol will then return this result to the higher level. Packets will then be sent from this message until a close channel packet is sent. At this point the close packet is sent to the target panel. The target panel will acknowledge on the next cycle and the high level protocol will be informed.

III. NETWORK DESCRIPTION

Figure 1:
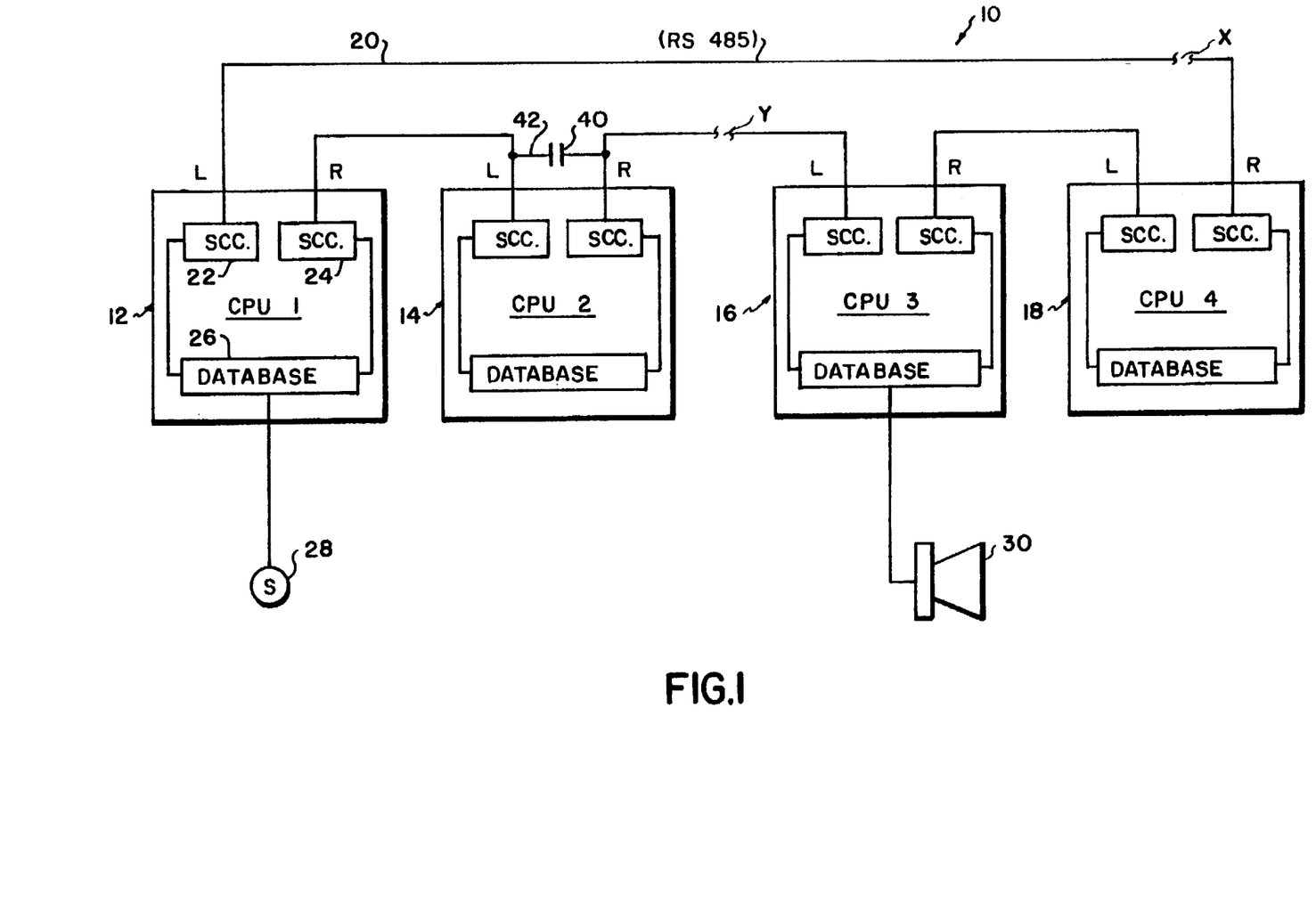
FIG. 1 is a block diagram illustrating a typical panel sub-system comprising a number of interconnected panels represented by the individual CPUs at each panel, which are essential elements, connected from panel to panel.

Referring now to the Figures of the drawing and particularly to FIG. 1, there is seen a block diagram of the panel sub-system or network 10 of the present invention having a group of several panels, for example, panels 12, 14, 16 & 18. Shown as representing such panels are a corresponding group of central processing units or modules denoted CPU 1–CPU 4.

The individual central processing units for the respective panels are seen connected or linked by a communication line 20 (RS 485) which can be constituted of a twisted pair of conductors. The particular illustration here is of a class A configuration or arrangement which forms a complete transmission ring or loop. The other basic arrangement or configuration is class B, these two types being well known in the art.

Within each of the individual panel CPUs, for example, CPU 1, a pair of serial communication controllers (SCC) 22 and 24 (left and right) are included for handling the required communication. These controllers which include drivers already noted, form part of the basic microprocessor within the CPU module. Likewise, a data base 26 forms part of the memory for the CPU module for purposes which will be made clear. It should be noted that the connection is termed, "right connect to left connect" in the class A configuration.

When an event occurs let us say, for example, that a smoke detector 28 connected to panel 12 becomes active in response to the sensing of smoke, a signal is fed to CPU 1. The scenario contained in data base 26 may call for a horn 30 to be energized in such event, horn 30 being connected to CPU 3. In the data base 26 there would be an instruction: if smoke at detector 28, turn on horn 24. In order that this scenario be fulfilled immediately and the desired action takes place, message priority must be established in the communication path between panels. The means in accordance with the present invention for so establishing message priority is called a two state token scheme.

The above example of horn 30 being activated is just a very simple example. But what happens on the network is that a token is being passed continuously: for instance, assume that it starts at CPU 1; a high priority state of the token is created, and what happens is that an alarm priority invitation to transmit (ARMPITT) will be transmitted throughout the network, guaranteeing that none of the panels has a high priority message pending. So as this high priority state token goes to CPU 2, if CPU 2 does not have an alarm, it will pass the token from its left to its right; CPU 3 will receive it on the left and determine whether or not it has a high priority message; if it doesn't, the token will eventually come back to CPU 1. If at this particular time, a high priority event has not occurred, CPU 2 will have the opportunity to either use the token for a low priority task, such as to ask for a report, or to pass general information; or if it does not have any low priority task, it will simply pass the token to CPU 2. The token shows up at CPU 2; and CPU 2 passes the alarm token around again. If CPU 1 does not have an alarm at this particular time, the token comes back in, and CPU 2 has an opportunity to use its low priority state token.

Now CPU 2 may have a task: to send CPU 3 a very small block of data (128 bytes), so CPU 2 will be very quick to transmit it. CPU 2 starts the aforementioned transmission of the 128 bytes of data to CPU 3; at that instant, suppose that smoke detector 28 goes active to CPU 1. The CPU 1 response is held at its communications port until the transmission is done. When this transmission is done, the CPU 2 is going to send the alarm invitation to transmit (high priority state) token around. CPU 1 will grab it, because now it has a high priority, and CPU 1 will transmit to all panels the response to turn on a particular device, for example. The horn 30 is going to be activated, but other panels also receive the response so that the events could be logged on any of the LCDs or printers at the other panels. Of course, the response would be propagated to CPU 2 and CPU 3; hence, CPU 3 would turn on its horn. So basically there is in an interleave of a high priority state token and a low priority state token between every communication burst. It will be understood that the "token" consists of an invitation (2 bytes, or 10 bits, of data) that goes out serially on the RS 485 line and is received on the left side by each of the CPUs. However, as a useful analogy, the token can be thought of as a physical object, such as a cylindrical body having or not having a top or cap. (The high priority state being the cylindrical body without the top).

It will be understood that the present system is a distributed system. For this particular system there could be 186,000 points; consequently, the data base would have to be unbelievably large to contain all of that data. What is done, therefore, is that small pieces of the data base are distributed. There is very little redundant data in the data bases. Events that occur in a particular panel may activate devices on other panels, but the other panels don't have any record or any index of this particular device. Accordingly, that's why the data has to be continuously transmitted.

To emphasize the token concept involved in communication around the system, it should be noted that when a panel (CPU) receives the low priority state token it has the low and the high, because the only way a CPU can receive a low priority state token is if all other CPUs have indicated that they do not want the high priority state token. When such token comes back, a first CPU knows that there was no other CPU that wanted the high priority state token; so the first CPU gets to use the low priority state token. [The low priority state token is passed—you send the high—you get the high back—you get to use the low, and to send the particular low priority message].

It should be noted that when the class A configuration, already described, is first connected, i.e., when one installs the panels for the very first time, the network is completely confused because it keeps going left and it can't find the end. It looks like an infinite length; so an operator has to come up to one of the CPUs and, using the key pad, to tell it, "you're number 1". Now, the CPU is able to recognize that when the trouble comes from the right, its going to stop physically, configure number 1 and physically map the rest of the CPUs.

It will be appreciated that although certain known local area networks (LANS) do employ a single ring with a token that's passed one by one around the ring, the big difference is that the present invention is based on a low & high state token concept: a signal packet having two possible coded states.

There are basically 4 different modes of broadcast operation on the network: the two involving the high and low priority state tokens, which have been discussed; with these high and low priority state tokens, one can have either an exclusive or "shared" bandwith mode of operation. What is normally involved when reference is made to shared bandwith, is that a given token is used once, and then the token moves on. If you can only send 10 bytes of data and you have 100 to send, the token must pass 10 times to deliver the complete message. Under certain circumstances one may want to deliver that 100 bytes of information in one burst. If that's the case, and under certain design criteria, one can basically set the bandwidth at 4, for example. Accordingly, the token will be kept and 10 bytes will be sent, and then there will be an acknowledgment from those 10 bytes and then the next 10 bytes will be sent and so on until all 100 bytes have been sent. The task will be continued and thereafter the exclusive bandwith mode will be terminated; and the token starts passing again. That mode will be used, for example, for down loading data bases which are very time consuming and basically require the system to be off line anyway. So we can take the network down and the fire panels will stand, or run in standby or stand alone mode. One use for this particular mode would be for maintenance purposes.

Network Shadowing

Another inventive feature of the present invention (seen in FIG. 14) is called network shadowing. Simply stated, this involves a software routine that is based on the previous scheme of the data base being propagated to all panels. Thus, in the example specified previously, the same response for that first detector is propagated from CPU 1 to 2, 3 and 4, but only the horn 30 on CPU 3 was actually being turned on. An algorithm is provided such that if there was another CPU 4, CPU 2 and 4 would have taken that horn set and copied it as if it were its own; but it would not cause an action, since the panel address is invalid; however, the information is held in memory so that if CPU 3 ever went down because it got reconfigured from the network, lost power, and it had to reboot, then when it came up, its neighbors on the network (CPU 2 and CPU 4), are able to assist it effectively to say, this is where you are at; we've been kind of shadowing and this is your relay sets, because of the fact that this is a distributive system., CPU 1 doesn't know what information was lost from CPU 3, but its neighbors respond to the information they receive and know that CPU 3 has rebooted. Therefore, CPU 2 and CPU 4 inform CPU 3 that his horn should be turned on.

Shunt Feature

There is also an arrangement on the RS 485 line so that if any of the CPUs actually die, if they lose power, a relay that's normally energized to have its controls open, then closes its contacts 40 and establishes shunt 42 between left and right on panel 14. Therefore if power is lost for any reason CPU 2 will be by-passed such that CPU 1 and CPU 3 will be directly connected for communication. This is a kind of a safety feature and we are mandating that our lengths between 3 panels don't exceed the maximum length of the RS 485, so that if you do lose that second CPU the distance between #1 and #3 will not be great enough to where it will not function.

Sub-net Feature

Sub-net is a token traffic type of a network. What that means is if, for instance, you had a class A system that was connected, as in FIG. 1, with the loop closed; then, if the line 20 became broken at point X, the network would become a class B network and the left most panel (panel 12) would become the master. Now if the network were to break again at point Y, there would be two networks. Panel 12 would be the master for the network on the left because it would be the left most, and Panel 16 would be the left most for the other network, so basically there would be two networks. If intermittent disconnection and re-connection occurs, the two networks described will be effectuated and then when they came back together, i.e., when the two networks are then re-connected, a data collision occurs. What happens is all the CPUs destroy the alarm PITT, or the high priority token. Once everything is destroyed, CPU 1 will create the new token and re-join the network as a class B, four Node network.

Forced Link Disable Feature

Forced link disable means that the connection that was broken at point X can be accomplished by means of software. A password is entered at a front panel to logically break the connection. Let it be assumed that a class B configuration exists. And CPU 1 through CPU 3 are running, but not CPU 4—because of the break—so CPU 4 keeps rebooting. Everytime it reboots it destroys the network such that CPU I through CPU 3 have to re-configure. Hence, performance drops way down. Since this panel (CPU 4) would basically be destroying the functionality of the first 3 panels, an operator uses a key pad, effectively instructing: "disable link between CPU 3 and CPU 4". Hence, CPU 4 is isolated. Therefore, the class A configuration would become a class B configuration.

As has been previously noted, an SCC is a Serial Communications Controller (See FIG. 1) and is basically the same thing as a universal receiver transmitter. There are two within each CPU. The first is a right SCC and the second a left SCC. This is really the internal driver that runs the hardware at the low level protocol out of the port.

It will be appreciated from Part I of this detailed description that panels are dynamically configured to a number of states, the principal ones of which are: Receiving left, re-transmitting right or Re-transmitting left, receiving right. However, there is also a state called Receiving left, repeating right, (third state under Right/Left Section of Part I). "Repeating" simply means electrically repeating such that there is a one bit shift. When a token is being passed, the token can't be sent very quickly because every panel has to have the opportunity to see what the value is: when its the alarm token, there has to be a decision whether or not its going to be allowed to pass. So under that mode, when we're expecting a token, it is going to be received, looked at and re-transmitted. That's actually a function of software.

In the repeating state, the token has been passed and no CPU wanted it because they are only observers of the network. Yet, it is known that the owner of the low priority token is going to talk to somebody on the network. So in this particular case, it is necessary to not slow down the process by receiving all of the information and then retransmitting, which causes a huge delay; what is initiated is a repeater mode [that basically says, I'm not going receive the transmit, I'm not going to connect the hardware so that as each bit comes in, the bit gets shifted over to the right SCC, (the transmitter) and gets propagated out the right side, and I only have the ability to receive it]. So the token is being received at pretty much the same pace and all nodes on the network are receiving it. Accordingly, there is not a needless slowing down in the transmission.

IV. SPECIFIC EXAMPLES OF NETWORK OPERATIONS

In order to enable the man skilled in the art to appreciate the various types of network operations the following specific examples are provided. The description which follows describes a four node network which essentially corresponds with the already described panel sub-system as exemplified by the FIG. 1 illustration.

Network Startup

Figure 2:
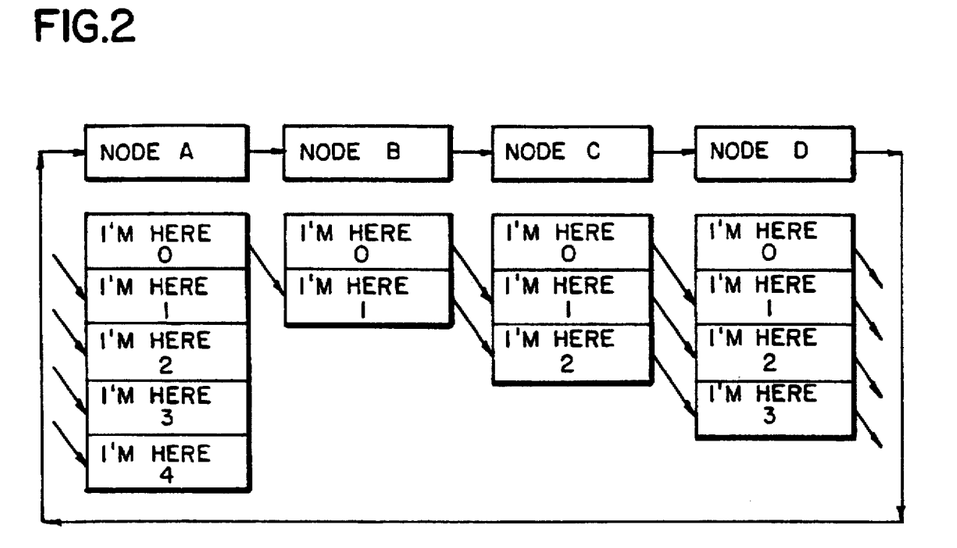
FIGS. 2-11 are simplified Node diagrams useful in describing the network operations in accordance with the present invention.

Referring to FIG. 2, the network is a class A configuration, which is the form of a ring or loop as seen. All nodes are initialized to start in a "listen left, transmit right" orientation. A node must be specified as "Node 0", or the first network node. In the example given in FIG. 2, Node A will serve as the first network node. As already described, each node will transmit on initial data packet to its right neighbor. This will be referred to as an, "I am here" packet. Embedded in this packet is a transmit count which is incremented by a given node, in this case Node A, prior to transmission to the next node to the right, accordingly, as seen by the arrows. After a specific guard time in the packet format has passed, each node examines its received packet count and utilizes that number as its network address. Thus Node B will have the network address of Node 1 or the second network node. The sequence continues to the right and finally Node A in detecting account greater than the maximum address which here is 3 for a Node D will declare a class A network end start the network operation.

Figure 3:
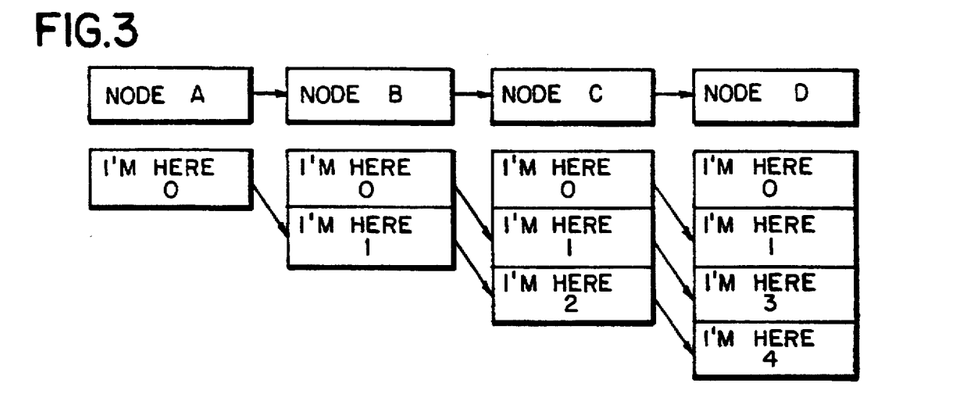

Referring now to FIG. 3, there is shown a class B configuration which works essentially the same as class A with the following exceptions: A "Node Zero" is not specified since, in this example, Node A is physically the head of the network. Hence, Node A will not receive any, "I Am Here" packets and Node A has a guard time in which it times out after not receiving any such packets and declares itself head of the network.

From the above it will be appreciated that in the class B configuration the left most node becomes the head of the network, whereas in the class A case a different rule operated.

Message Transmission

Figure 4:
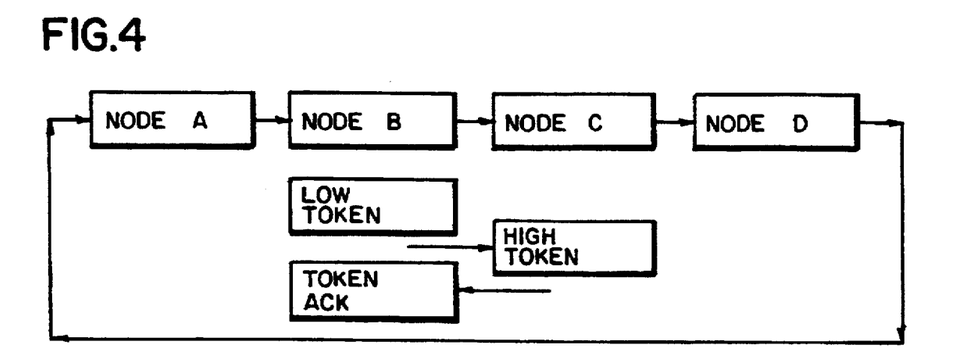
Figure 5:
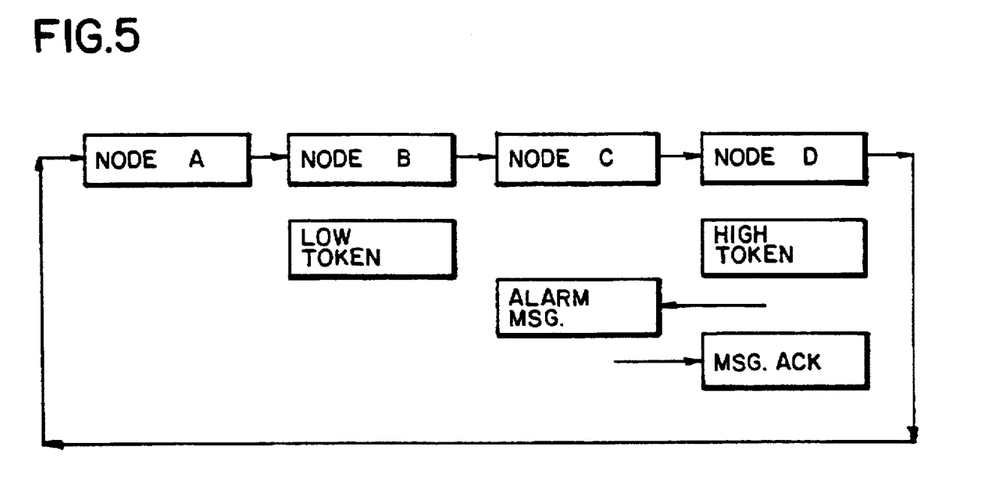
Figures 6, 7:
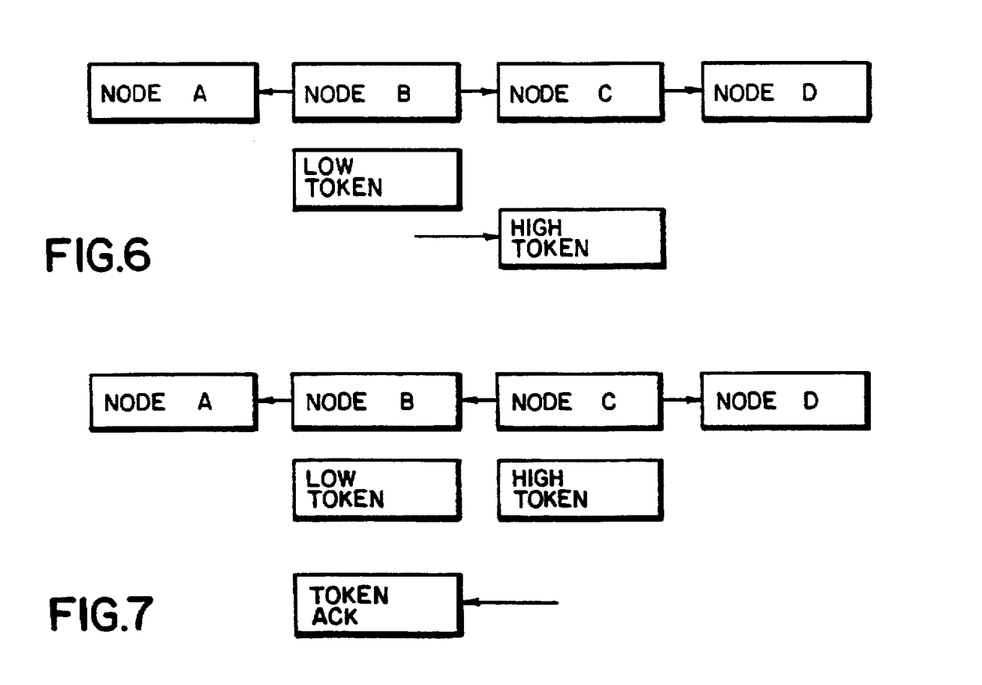
Figure 8:
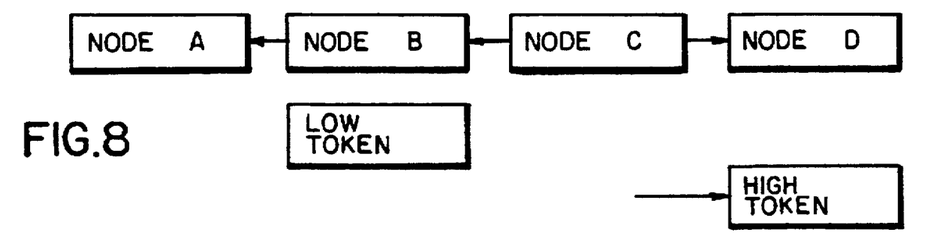
Figure 9:
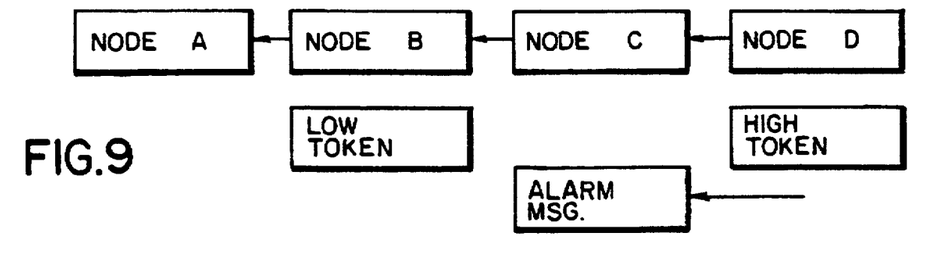
Figure 10:
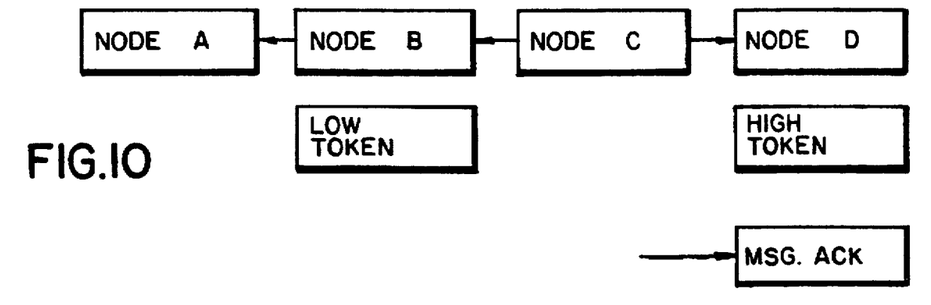
Figure 11:
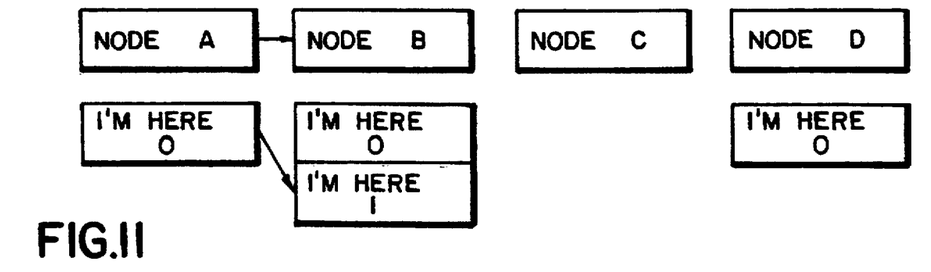

In the examples to be described by reference to FIGS. 4 and 5, Node B has a LOW priority message for Node D and Node D has an ALARM Priority message for Node C, whereas Nodes A and C have NO messages to send. Node B currently holds the transmission token (this transmission token is a LOW priority pass to send);

As will be understood, a class A configuration is involved in FIGS. 4 and 5. Node B holds the transmission token, that is, the LOW priority token. Since it has only a LOW priority message to send, the HIGH priority or ALARM token must be orbited, i.e., sent around the loop to ensure that any ALARM priority messages are sent prior to the sending of Node B's LOW priority message. Node B broadcasts, passing the ALARM priority token to Node C. Node C acknowledges (ACKS) to token pass. Now Node C, not having any message to send passes the token to Node D. Now Node D transmits its HIGH or ALARM priority message to Node C. Then Node C returns an acknowledge to Node D. Node D then passes the token to Node A. Node A acknowledges the HIGH priority token. Not having any messages to send Node A returns such token to Node B. Node B sensing the return of the token, terminates the ALARM priority token and transmits its LOW priority message to Node D. Node D acknowledges a message and Node B passes the token to Node C and the process begins again.

When the network is operating in the class B configuration, the message transmission scheme works the same as in the class A network of FIGS. 4 and 5 already described, but with the added complexity of having to swap transmit or receive directions since the transmit loop or ring is no longer present.

In Class B the message transmission scheme works the same as in the Class A network with the added complexity of having to swap transmit and receive direction since a transmit loop is no longer present.

Node B currently holds the transmission token. Having only a LOW priority message to send, it must orbit the ALARM token to ensure any ALARM priority messages are sent prior to the sending of its LOW priority message. Node B broadcasts passing the ALARM priority token to Node C. Nodes A & B now listen right and repeat left. Node D listens left and repeats right. Node C transmits left and right. Node C acks the token transfer. Node C, not having any message to send passes the token to Node D. Nodes A, B & C listen right and repeat left. Node D transmits left and right. Node D transmits its message to Node C. Node C transmits left and right. Node D listens left, repeats right. Node C return and ack to Node D. Node C returns to listen right repeat left. Node D returns to transmit left and right. Node D, then passes the token to Node A. Node A acks the token. Not having any message to send, Node A returns the Token to B. Node B, sensing the return of the token, terminates the ALARM priority token and transmits its LOW priority message to Node D. Node D acks the message, and Node B passes the token to Node C and the process begins again.

Network Segregation and Regeneration

Segregation

In both the Class A and Class B networks, network segregation occurs in the same manner. All network elements sense the failure of the token to be passed. At this point the Network Startup procedure, already discussed, is initiated with all elements a node can reach. This may result in several independent sub-networks being created if an internal node has failed or been removed from the network. In the following example, Node C has failed or been removed, a sub-network of Nodes A & B and a sub-network consisting of only Node D result. Note, the creation of 2 Class B networks will also result if this failure occurs in the Class A scenario and loop connectivity is lost as a result of the Node C failure/removal.

Regeneration

In both the Class A and Class B networks, the end nodes poll for the addition of a new node. Upon detection, the token, when received, is destroyed, forcing the initiation of the Network Startup procedure, which results, in the example case of Node C rejoining the network, in the recreation of the original network scenario.

V. SOFTWARE EMBODIMENTS FOR NETWORK TOKEN - PASS SCHEME AND NETWORK SHADOWING; CODES USED TO REPRESENT TWO STATES OF TOKENS

In order to round out the previous description of the operation of the system in regard to the several features of the invention, software embodiments or implementations are herewith presented. However, before getting into their detailed description, it is believed helpful to those skilled in the art to provide a specification for the "network token" previously referred to briefly.

Such token is a 4 Byte (32 Bit) signal packet that can exist in either of two states:

High Priority Indication

Low Priority Indication

The two states are differentiated in the second byte of the token packet. A 40 hex value in this field indicates a high priority token packet. A 41 hex value indicates a Low Priority Token packet.

The token packet is described as follows:

1 byte SOP (Start of Packet)

1 byte Token Priority 1 byte Panel Address 1 byte Token_EOP (Token End of Packet)

SOP is defined as a value of F8 hex. Token_EOP is defined as a value of FF hex. Where the Panel Address is any panel address in the valid range of 0 to 63.

Thusly, a Network Token appears as follows: (where address 0 is used in the examples)

| Low Priority Token | |
|---|---|
| F8 41 00 FF | Hex representation |
| 11111000 01000001 11111111 | Binary representation |
| High Priority Token | |
| F8 40 00 FF | Hex representation |
| 11111000 01000000 00000000 11111111 | Binary representation |

For convenience, reference has sometimes been made, and will be made hereafter, to "high and low priority tokens"; but it will be understood that a simple entity or signal packet is involved, albeit in slightly different coded form at different times to represent two defined data states.

Figure 12A:
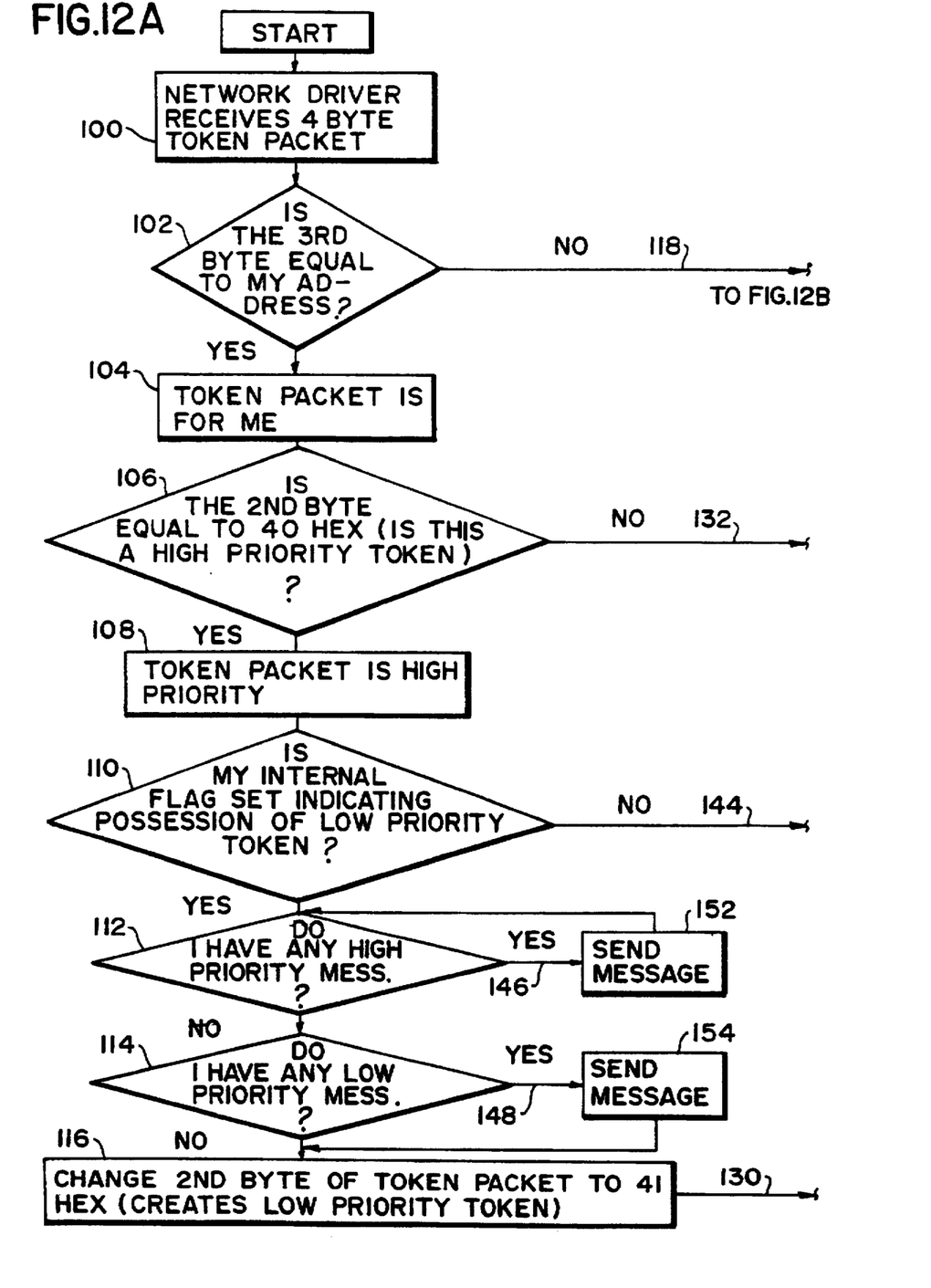
FIGS. 12A-12B depicts a flow chart or process diagram of the operative steps and means for realizing those steps in implementing a network token pass scheme.
Figure 12B:
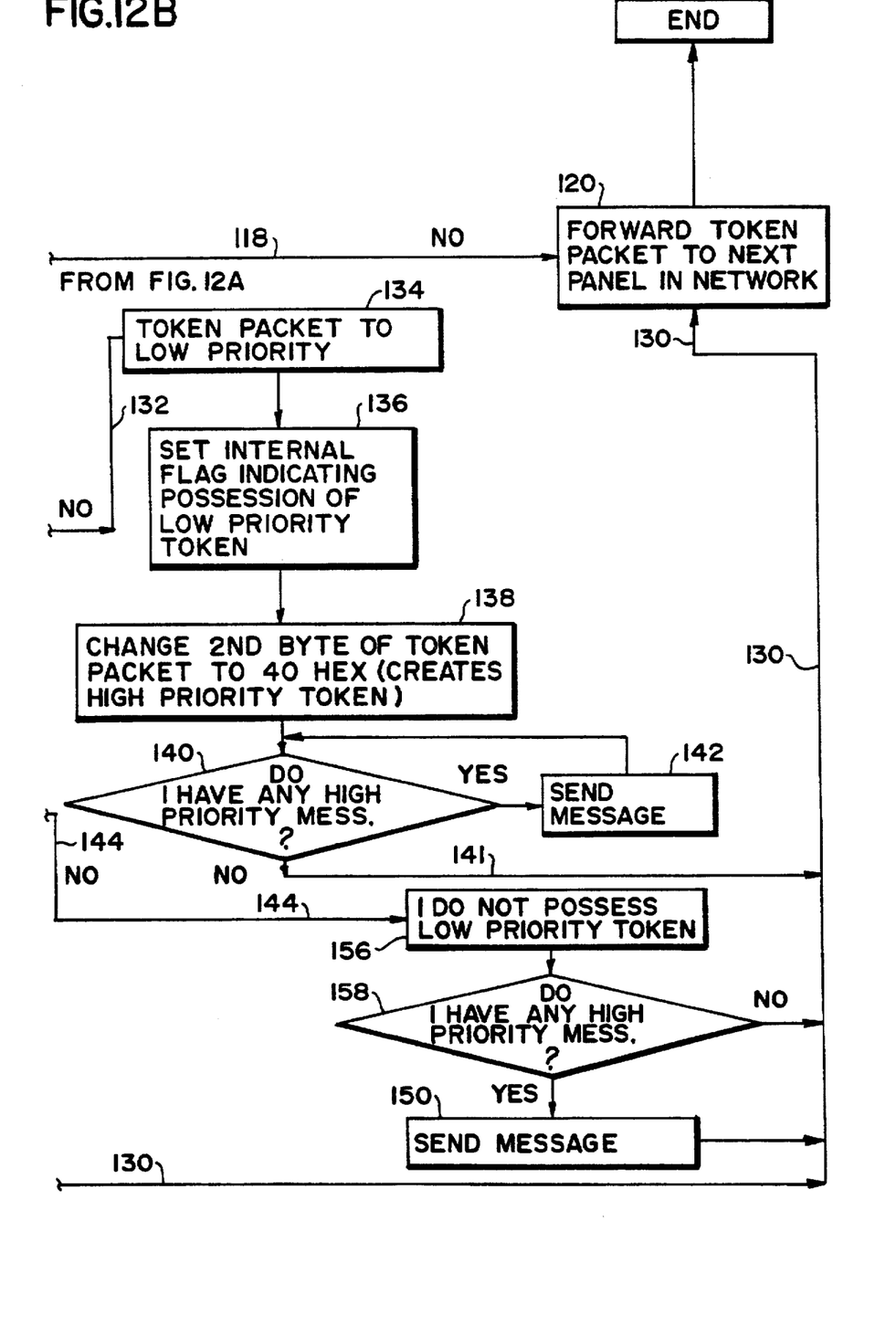

Referring now to FIG. 12 there will be seen a flow chart containing a series of steps or operations performed by the system of the present invention under the control of suitable programming. From the start point seen in FIG. 12, it is well to concentrate for the moment on the left side logical pathway wherein the non-decisional blocks depict conventional steps 100, 104, 108 and 116, whereas there are also included decisional blocks 102, 106, 110, 112 and 114.

It will be seen that a branching logical pathway 118 at the tope of FIG. 12, extends to another conventional block 120 which constitutes an end point, the logical pathway 118 being a NO, pathway results in the token packet being forwarded to the next panel in the network. It will be noted that the logical pathway 130 at the right in FIG. 12 extends directly from the block 116 to the final or ultimate block 120, where again the result is forwarding of the token packet to the next panel.

It will also be noted that further pathways extend, for example, from the decisional block 106 by way of the NO logical path 132 to block 134, thence to blocks 136 and 138 and finally to decisional block 140. One logical output from 140 is a YES output which extends to block 142, resulting in the sending of the appropriate message; whereas the NO logical pathway 141 from 140 extends to the pathway 130.

It will likewise be appreciated that other branching pathways 144, 146 and 148 extend from the respective logical blocks 110, 112 and 114 and in all these cases the eventual result is the sending of messages, as indicated by blocks 150, 152 and 154. In the case of a send message, block 150 is preceded by the conventional block 156 and a decisional block 158; the latter being connected to a NO pathway to main pathway 130.

Figure 13:
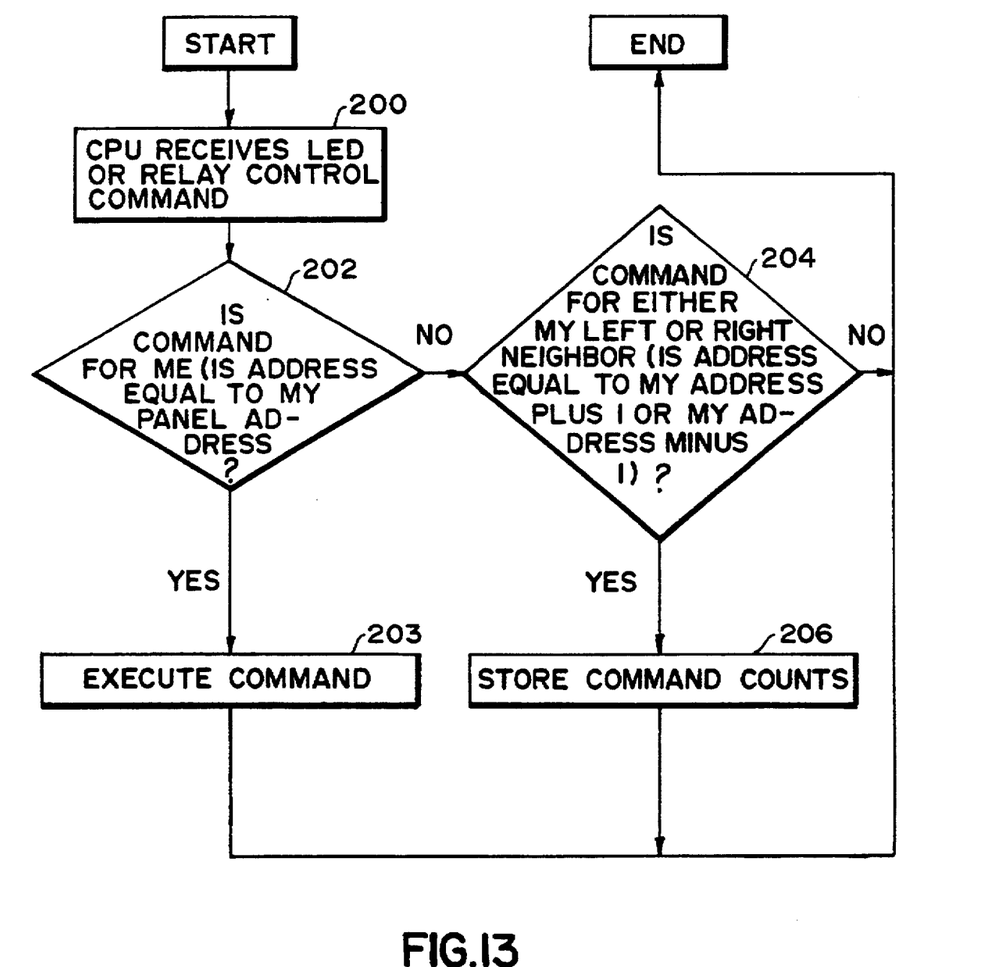
FIGS. 13-14 depicts other flow charts, similar to that in FIG. 12, but directed to implementing a network shadowing scheme.

Turning now to FIG. 13, the first portion of the network shadowing routine of the present invention is depicted and this involves, after the start operation, the performance of steps or operations 200, 202, 203, 204 and 206, wherein 200, 203, and 206 are non-decisional blocks or functions and 202 and 204 are decisional with YES/NO output paths. The essential purpose of the operations depicted in FIG. 13 is for the CPU to receive a command and to insure that the command has the proper address equal to the panel address. If it does, then the particular command is executed. If not, the command—if it is for either the left or right neighbor, that is, for the left or right CPU—then that command is stored and the end point is thereby reached. Likewise the end point is reached if a NO output results because the command is not for either the left or right neighbor.

Figure 14:
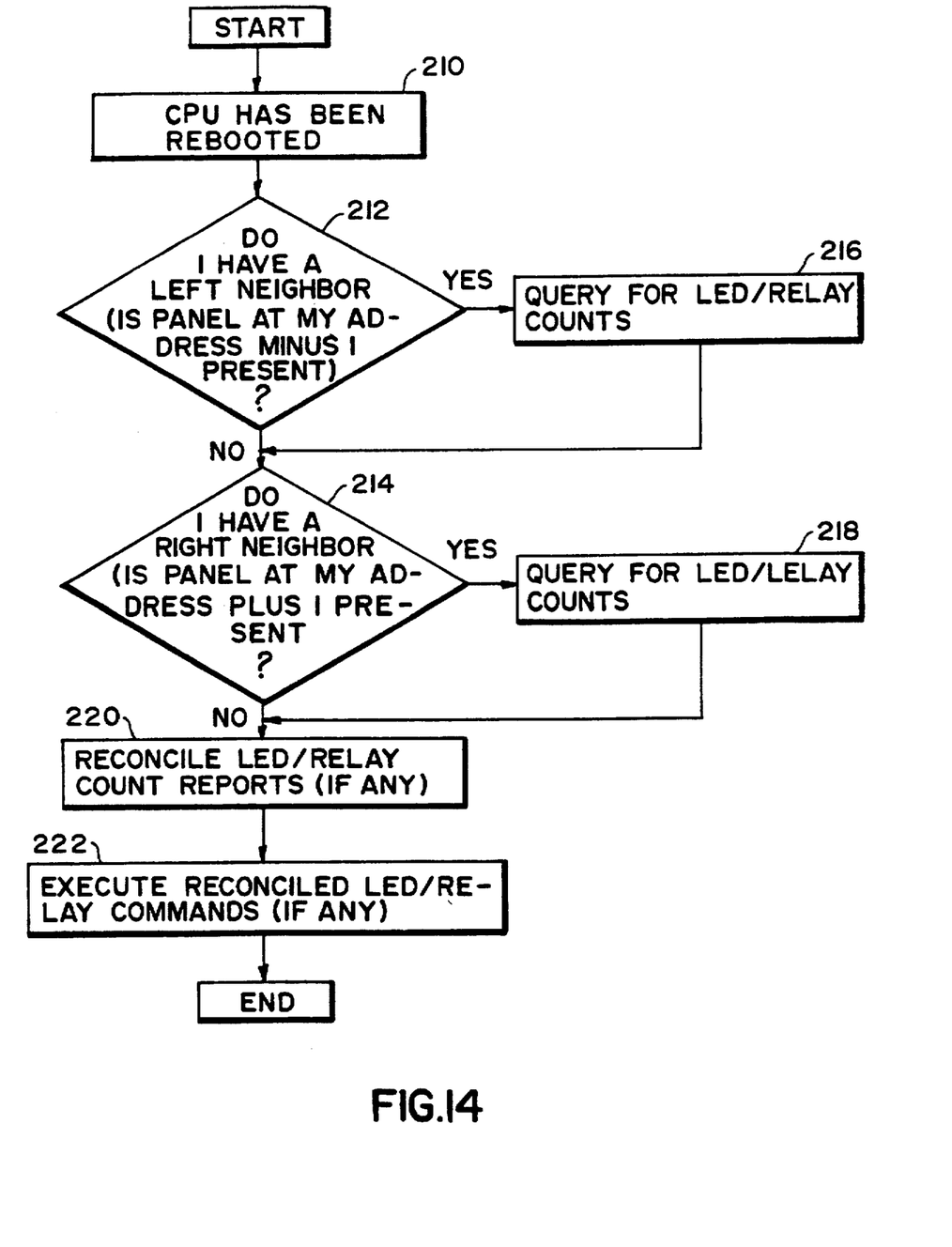

In FIG. 14 the operation is depicted for the situation of a given CPU that has first failed or shutdown and then has been rebooted (the latter situation being shown in block form by block 210). In such situation the decisional block 212 performs the step of inquiring whether there is a left neighbor and then, if the answer is NO, whether there is a right neighbor. If the answer to the questions posed by decisional blocks 212 and 214 is YES, then the query of blocks 216 and 218 is carried out in succession, such step having already been described in the previous portions of the specification. From the NO output of the second decisional block 214, that is, block 214, the output extends to the steps of "Reconcile the LED/Relay count reports, if any" (block 220) and "Execute the reconcile commands, if any" (block 222).

What this routine of FIG. 14 accomplishes is fulfilling the required scenario for a given CPU; for example, the turn on of its associated horn is accomplished by either its left or right neighbor once that given CPU has been rebooted. This is an important and unique function in the operation of the present system.

The invention having been thus described with particular reference to the preferred forms thereof, it will be obvious that various changes and modifications may be made therein without departing from the spirit and scope of the invention as defined in the appended claims.

We claim:

1. A life safety system having a message priority comprising:

a network of panels, each panel including a first module in the form of a central processing unit, and a plurality of local I/O modules connected to the central processing unit and to each other;

means for establishing message priority in communication between said panels, said means including a two-state token form of coded invitations to transmit messages, the first state of the token representing a low priority invitation and the second state of the token representing a high priority invitation;

said means for establishing message priority further including means for passing said tokens continuously between panels to determine if any panel has a high priority message; wherein a given panel, having a low priority message and holding the token in its first state, recognizes that state of the token and generates the second state of the token representing a high priority invitation, which it then passes on to determine if any other panel has a high priority message to transmit; and, wherein that other panel having a high priority message preempts communication of messages between panels by first capturing the token which is in the second state and then transmitting its high priority message to an intended panel.

2. A system as defined in claim 1, in which a low priority message is transmitted from a first panel to other panels only in the event that no panel in the system has a high priority message.

3. A system as defined in claim 1, in which each token state consists of ten bits of data which are different for the two states.

4. A system as defined in claim 1, further including network shadowing means at a given panel for determining when an adjacent panel that has lost power requires assistance to perform a previously assigned function and for assisting said adjacent panel by communicating the assigned function, including means for storing at the given panel the function assigned to the adjacent panel.

5. A system as defined in claim 1, in which relay contacts are provided to shunt between the lines connected to the opposite sides of a panel so that, should power fail to the panel, the relay contacts will close to provide line continuity while eliminating said panel from the network.

6. A system as defined in claim 1, in which naturally occurring opens in the return line between panels is a class A operation scheme result in a transition to class B operation.

7. A system as defined in claim 1, further including software means responsive to a key pad or the like for simulating an open condition so as to isolate a panel that is faulty.

* * * * *